United States Patent Office 3,826,741
Patented July 30, 1974

3,826,741
METHOD OF TREATING WASTE SOLUTION CONTAINING CHROMATE ION OR CYANIDE ION
Toshihiko Nakamura, Yokohama, Japan, assignor to Nihon Filter Co., Ltd., Tokyo, Japan
Filed Nov. 3, 1972, Ser. No. 303,636
Int. Cl. C02b 1/34
U.S. Cl. 210—50     1 Claim

ABSTRACT OF THE DISCLOSURE

A method of treating a waste solution containing chromate ion or cyanide ion, wherein a redox potentiometer with a pH correction circuit is used instead of separate redox potentiometer and pH meter commonly used in the conventional treating method of waste solution, said redox potentiometer with a pH correction circuit has a redox potential detecting part and a pH detecting part for the detection of the redox potential and the pH electromotive force of the waste solution being treated and the output voltages are superposed within said pH correction circuit so that the variations of redox potential caused by the variations of pH value of the waste solution is compensated and a corrected output voltage which indicates the redox potential corresponding to a pre-set pH value of the waste solution is generated, the redox potential and the pH electromotive force of the waste solution being treated in the treatment tank are detected respectively by said redox potential detecting part and pH detecting part of said redox potentiometer with a pH correction circuit, and the amount of treating chemicals being fed into said treatment tank is adjusted, by a flow regulator which is controlled in response to the corrected output voltage delivered from said pH correction circuit of the redox potentiometer, to a quantity as the chemical reaction is carried out at the equivalence point.

---

This invention relates to a chemical treatment of waste solutions containing chromate ($CrO_3$) ion or cyanide (CN) ion.

More particularly, this invention relates to an improved method of treating a waste solution containing chromate ion or cyanide ion by the use of treating chemicals such as a reducing agent or an oxidizing agent, wherein the amount of reducing agent or oxidizing agent to be fed to a treatment tank through which the waste solution to be treated is flown, is controlled in response to the voltage which always indicates a corrected redox potential corresponding to a pre-set pH value of the waste solution regardless of the change of redox potential (hereinafter referred to ORP) caused by the change of pH value of the waste solution to be treated.

It is an object of this invention to provide a method of treating waste solution which method is capable of controlling automatically the amount of treating chemicals in such a quantity that the chemical reaction is always carried out at the equivalence point.

Another object is to provide a method of treating a waste solution, wherein the amount of treating chemicals to be fed to the treatment tank is controlled, in response to the corrected output voltage which is obtained from a ORP meter provided with a pH correction circuit and which indicates the ORP corresponding to a pre-set pH value of the waste solution to be treated. The amount of treating chemicals is controlled to such a quantity as necessary to maintain the treatment at the equivalence point of the chemical reaction regardless of the variation of the pH value of the waste solution.

Still another object of this invention is to provide a method of continuously treating a waste solution containing chromate ions or cyanide ions, which method permits to prevent the occurrence of undesirable results such as the discharge of the incompletely treated waste solution from a treatment tank as the result of insufficient treatment due to the oxidizing or reducing agent being fed in insufficient amounts, or the waste of the oxidizing or reducing agent as the result of the fact that some of the agent fed into a treatment tank flows out from the tank without reacting with the waste solution because such reagent has been fed in excess.

According to this invention, these objects can be attained by a method of treating a waste solution containing chromate ion or cyanide ion by the use of treating chemicals, wherein a redox potentiometer (hereinafter referred to ORP meter) having a ORP detecting part and a pH detecting part and provided with a pH correction circuit to which the output voltages from said respective detecting part are applied and superimposed within said circuit so that the variations of ORP caused by the variations of pH value of the waste solution are compensated and a corrected output voltage which indicates the ORP corresponding to a pre-set pH value of the waste solution is used; the ORP and the pH electromotive force of the waste solution being treated in a treatment tank are detected respectively by said respective detecting parts; and the amount of treating chemicals fed to said treatment tank is controlled automatically in response to the corrected output voltage from said pH correction circuit of the ORP meter.

This invention itself, other objects and advantages of this invention will be apparent from the following description explaining in detail the conventional treating method and the preferred embodiments of this invention by referring to the accompanying drawings.

In the drawings, FIG. 1 is a schematic diagram of a system for treating waste solutions containing chromate ion or cyanide ion according to a conventional method;

There are various methods of chemically treating chromate ion or cyanide ion containing waste solution, among which following ways are widely applied.

(1) Treatment of chromate ion containing waste solution: Hexavalent chromium ion ($Cr^{6+}$) is reduced by reducing agents such as sodium bisulfite to tri-valent chromium ion ($Cr^{3+}$) while keeping the pH of the waste water at a value of 3.0 or below. The resulting product then is neutralized with alkali to remove chromium as the hydroxide. An exemplified reduction in this treatment is indicated by formula (1).

$4CrO_3 + 3Na_2S_2O_5 + 3H_2SO_4 \rightarrow$
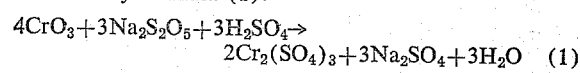
$2Cr_2(SO_4)_3 + 3Na_2SO_4 + 3H_2O$     (1)

(2) Treatment of cyanide ion containing waste solution: By keeping the pH of a waste solution at a value of 10.0 or above, cyanide is oxidized by an oxidizing agent such as sodium hypochloride. An exemplified reaction in this treatment is shown by formula (2)

$$2NaCn + 5NaOCl + H_2O \rightarrow N_2 + 2NaHCO_3 + 5NaCl \quad (2)$$

In the equipment established to carry out the treatment processes mentioned above, an automatic control system regulating operations based on results of measurement by means of measuring instruments is incorporated, for reasons of reliability and economy.

Figure 1:
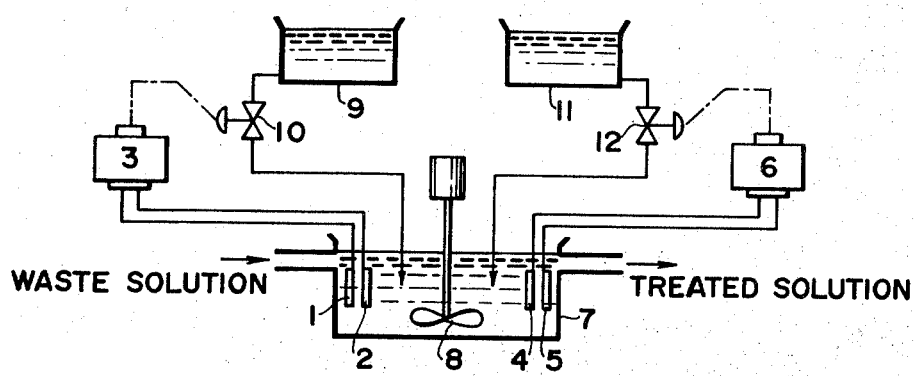

The conventional treatment system using said automatic control system for treating waste solution containing chromate ion or cyanide ion is typified by the systematic diagram shown in FIG. 1. In this conventional treating system, a pH meter 3 having a detecting part including a glass electrode 1 for pH measurement and a reference electrode 2, and a ORP meter 6 having a detecting part including a redox electrode 4 of noble metal and a reference electrode 5 are provided, and the detecting parts of both of the pH meter and ORP meter are disposed in a treatment tank 7. Chromate ion containing waste solution (hereinafter called chromate waste solution) or cyanide ion containing waste solution (hereinafter called cyanide waste solution) is continuously flown into said tank 7, and the waste solution is continuously agitated by a suitable agitator 8 and is treated by the operations described below. The waste solution after treatment is flown from said treatment tank.

The pH meter 3 performs the functions of detecting the pH value of the solution in said treatment tank 7 by the detecting part thereof, and automatically controlling a flow regulator 10 attached to a pH adjusting solution tank 9 by operating a suitable controller (not drawn) in response to the pH value detected. In this manner the pH of the solution in said treatment tank 7 is always kept to a pre-set value (e.g. 3.0 for chromate waste solution and 10.0 for cyanide waste solution) by the control of the flow rate of acid solution (as to chromate waste solution) or alkali solution (as to cyanide waste solution) fed to treatment tank 7 from pH-adjusting solution tank 9.

The ORP meter 6 detects by the detecting part thereof ORP of the solution in said treatment tank 7, the pH of which is controlled to keep a pre-set value by above-mentioned operation of the pH meter 3 and flow regulator 10, and automatically controls a flow regulator 12 attached to a treating chemical storage tank 11 through the operation of a suitable controller (not drawn) depending upon the voltage detected, in order to regulate the flow rate of the reducing agent (for chromate waste solution) or the oxidizing agent (for cyanide waste solution) fed from said treating chemical storage tank 11 to said treatment tank 7, whereby allowing the chemical reaction to take place under such conditions that the degree of oxidation or reduction of the solution in said treatment tank is exactly kept at the equivalence point.

However, in the process of treatment carried out by the conventional treatment system as shown in FIG. 1, wherein a pH meter and a ORP meter are provided separately and detection and control of the degree of progress of the chemical reaction is carried out by the ORP meter while pH control is carried out by pH meter, because of the difficulty of a precise adjustment of pH by pH meter and because the ORP of ion-containing solution varies with its pH change, it is impossible or extremely difficult to carry out reduction or oxidation under such conditions that the ORP of the solution is always kept at the equivalence point. Various disadvantages of the conventional method are pointed out as below.

Figure 2:
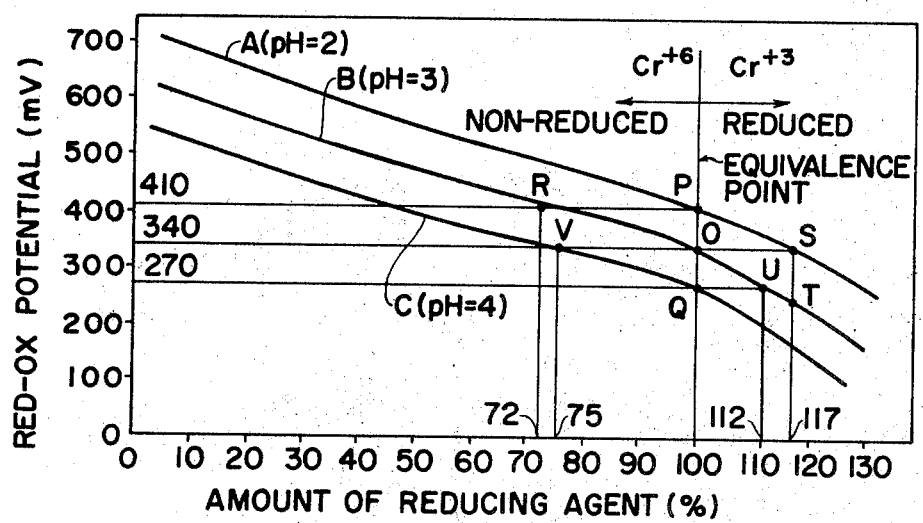
FIG. 2 is a diagram showing the relation between the amount of reducing agent required for the treatment of a chromate ion containing waste solution and the ORP of the solution.
Figure 3:
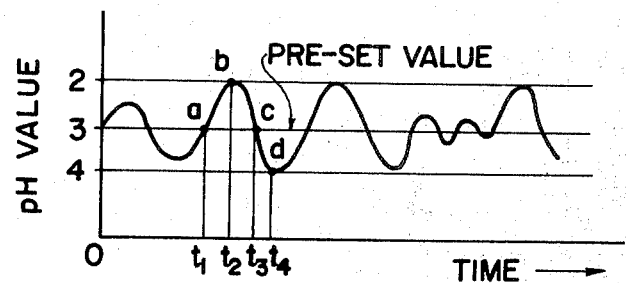
FIG. 3 is a diagram showing the variation of pH value of a chromate ion containing waste solution with time during the treatment.

First, as to the treatment of chromate waste solution, defects of the treatment by said conventional system are given in detail with reference to FIG. 2 indicating relations between quantity of reducing agent—the necessary amount for reaction at the equivalence point is indicated as 100%—and ORP of said waste solution, and to FIG. 3 showing pH change of said waste solution with time passage.

Assuming that the regulation of the flow rate of said reducing agent from said treating-chemical storage tank 11 by the ORP meter 6 is conducted aiming at obtaining reducing reaction corresponding to the equivalence point or the point of 100% amount of the reducing agent in FIG. 2, while the control of the flow rate of the acid solution from said pH-adjusting solution tank 9 by the pH meter 3 is done aiming at keeping the pH of said waste solution to a value 3.0, for instance, in this case flow rate of said acid solution is controlled according to pH value of said waste solution detected by the pH meter 3. In practice the change of pH of the waste solution to the pre-set value more or less delays from the time of the control of flow of the acid solution, and the pH of said waste solution in said treatment tank inevitably changes to above or below of pre-set pH value (pH=3.0) with time as is shown, e.g. by the curve in FIG. 3, even if the pH value of said waste solution is automatically controlled by the pH meter 3.

Performance of the treatment system shown by FIG. 1 under such conditions as mentioned above is considered as follows.

(a) Assuming that at time $t_1$ in FIG. 3 the pH meter 3 is indicating a pH-value (pH=3) at point "$a$" on the curve in the same figure, and 100% amount of said reducing agent is required to be fed to the treatment tank 7 from the treating chemical storage tank 11, the ORP meter 6 indicates ORP (340 mv.) at point "O" on the curve-B (ORP curve for a pre-set pH value, pH=3) in FIG. 2, and the flow regulator 12 is kept under such conditions which permit a feed of 100% quantity of said reducing agent required.

(b) If the pH of the waste solution has changed at time $t_2$ to a value at point "$b$" (pH=2) on the curve of FIG. 3 and quantity of the reducing agent fed to said treatment tank 7 is still kept 100% (corresponding to the equivalence point), the ORP meter 6 indicates ORP (410 mv.) at point "P" on the curve-A (corresponding to pH=2) in FIG. 2. This potential is equal to that at point "R" on the curve-B for the pre-set pH value, pH=3. Furthermore, the latter potential indicates that the quantity of the reducing agent is only 72% of the quantity corresponding to the equivalence point. Thus the flow regulator 12 is operated in the direction to increase feeding of the reducing agent until the quantity of the reducting agent increases to point "S" on the curve-A, or 117%, which corresponds to a point indicating the ORP just equal to the ORP (340 mv.) at point "O" on the curve-B. Thereafter, the flow regulator 12 is maintained in the state of 117% feeding, which results in continuing wasteful outflow and consumption of the reducing agent due to feed of reducing agent 17% higher than needed to the treatment tank 7.

(c) If the pH of the waste solution comes back again to point "$c$" (pH=3) on the curve in FIG. 3 at time $t_3$, then the ORP meter 6 indicates ORP at point "T" on the curve-B in FIG. 2, corresponding to 117% quantity of the reducing agent needed. Then, the flow regulator 12 is operated in the direction to decrease feeding of the reducing agent, which leads to a gradual decrease of the reducing agent fed to said treatment tank.

(d) Thus, if the pH of the waste solution changes to that at point "$d$" (pH=4) on the curve in FIG. 3 at time $t_4$ and the amount of the reducing agent to be fed into the treatment tank 7 has been decreased at that time to 100% amount by the operation of said flow controller 12 described in the paragraph (c), the ORP meter 6 indicates ORP (270 mv.) at point "Q" on the curve-C (ORP curve equivalent to pH=4). This potential, however, stands for 112% amount of the reducing agent required corresponding to the same ORP at point "U" on the curve-B. The flow regulator 12 continues the operation in the direction to decrease the reducing agent, and when the amount of the reducing agent has been reduced to 75% quantity corresponds to point "V" on the curve-C, or the point having the same ORP as the ORP (340 mv.) at point "O" on the curve-B, the operation of flow regulator 12 to decrease the feeding is stopped and the flow regulator is maintained under conditions to keep the feeding of amount 75%. This results in continuous feed to the treatment tank 7 of the reducing agent 25% less than needed. Consequently, about 25% of the waste solution is discharged out from said treatment tank 7 without being treated.

Next, explanation of performance of the treatment system shown in FIG. 1 in the treatment of cyanide waste solution is given below in reference to FIG. 4 indicating relation between amount of the oxidizing agent—necessary amount for the reaction at the equivalence point is expressed as 100%—and ORP of said waste solution, and FIG. 5 indicating pH change of said waste solution with time.

Figure 5:
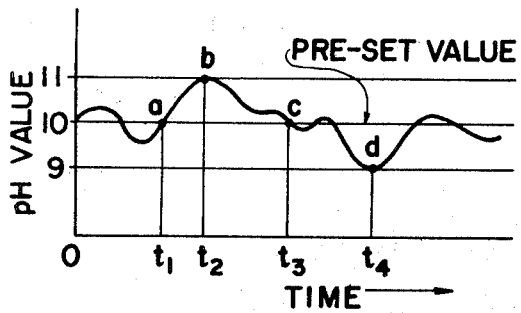
FIG. 5 is a diagram showing the variation of pH value of a cyanide ion containing waste solution with time during the treatment.

(a) Assuming that at time $t_1$, the pH of waste solution is at point "a" (pH=10) on the curve in FIG. 5 and the flow regulator 12 is kept in a condition permitting feed of 100% amount of oxidizing agent required.

Figure 4:
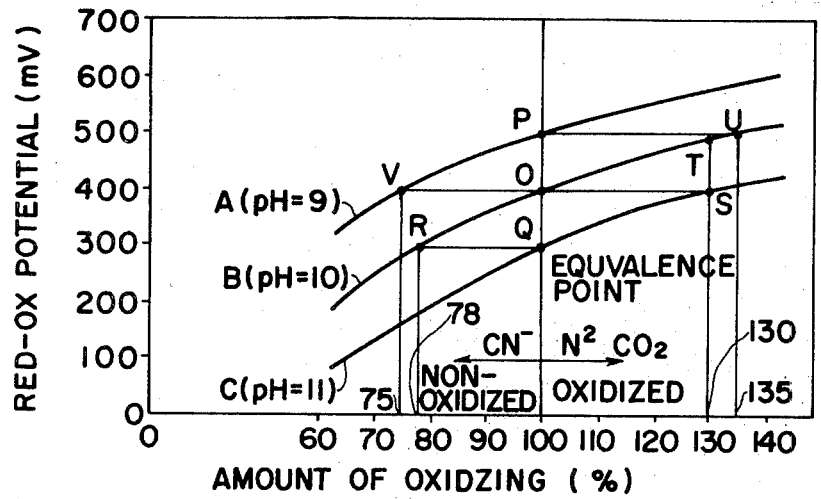
FIG. 4 is a diagram showing the relation between the amount of oxidizing agent required for the treatment of a cyanide ion containing waste solution and the ORP of the solution.

(b) If the pH of said waste solution has changed at time $t_2$ to that at point "b" (pH=11) on the curve of FIG. 5 and flow regulator 12 is still kept in the condition permitting feed of 100% amount of said oxidizing agent, the ORP meter 6 indicates ORP at point "Q" on the curve-C (ORP curve for pH=11) in FIG. 4. This potential is equal to that at point "R" on the curve-B (ORP curve for pre-set pH value, pH=10), or at the point indicating 78% amount of the oxidizing agent required, so that the flow regulator 12 is operated in the direction to increase feeding of the oxidizing agent, the operation is continued until the amount of the oxidizing agent increases to 130% amount corresponds to the point "S" on the curve-C or the point indicating the ORP equal to that at point "O" on the curve-B. Then, feeding of the oxidizing agent is maintained to this amount.

As a result, 30% excess of said oxidizing agent is continuously and wastefully flown into the treatment tank 7 and consumed.

(c) When the pH value of said waste solution is restored again to the value at point "C" (pH=10) on the curve in FIG. 5 at time $t_3$, the ORP meter 6 indicates ORP at point "T" on the curve-B in FIG. 4, and this ORP shows that the amount of the oxidizing agent is 130% of the needed quantity. So, the flow regulator 12 is operated in the direction to decrease the amount of the oxidizing agent until it is lowered down to 100%.

(d) At time $t_4$, if the amount of said oxidizing agent has been decreased to 100% and the pH of the waste solution is changed to the value at point "d" (pH=9) on the curve of FIG. 5, the ORP meter 6 indicates ORP at point "P" on the curve-A (ORP curve for pH=9) in FIG. 4. As this potential is equal to ORP at point "U" on the curve-B indicating 135% amount of the oxidizing agent required, the flow regulator 12 is still operated in the direction to decrease the amount of the oxidizing agent. When the amount of the oxidizing agent decreases to 75% indicated by point "V" on the curve-A or by the point showing the ORP equal to that at point "O" on the curve-B, the operation of said flow regulator 12 in the said direction is stopped, and feeding of the oxidizing agent is kept to the amount 75%. Accordingly, about 25% of the waste solution is continuously discharged without treatment, owing to a continuous feed of oxidizing agent 25% less than needed.

In treating chromate waste solution or cyanide waste solution continuously by conventional methods in which the amount of treating chemicals fed to said treatment tank is controlled by an ordinary ORP meter while the pH of said waste solution is controlled by a pH meter so as to be kept to a pre-set value, it can be clearly understood from the above-mentioned explanation that even when an equal amount of treating chemicals is being fed, the ORP indicated by the ORP meter varies with the change in pH value of said waste solution, and in order to control automatically the amount of said treating chemicals by utilizing the output voltage obtained by the ORP meter, it is necessary to maintain the pH of the waste solution constantly at a pre-set value or an aimed value. However, in fact it is almost impossible or extremely difficult to keep pH of waste solution continuously flowing to a constant value, owing to the off-set of the regulator and the time delay in the operation of the regulator, change in the concentration of the waste solution and in the concentration of acid or alkali solution, etc., even when an expensive, precisely adjustable pH controller which is commercially uneconomical is utilized; therefore a satisfying automatic feed control of treating chemicals by the use of an ordinary ORP meter is practically unattainable.

Obviously, discharge of incompletely treated solution containing untreated waste solution causes a lot of troubles. In order to prevent outflow of untreated waste solution, conventional methods necessitate waste solution treatment under conditions of excessive safety more than needed by the use of too excessive treating chemicals, regardless of economical view points.

Defects of the conventional treatment method mentioned above are itemized as follows:

(a) Untreated waste solution is allowed to flow out.

(b) Treating chemicals are apt to be excessively spent for safety, and this makes the conventional method quite uneconomical.

(c) Use of an expensive pH controller which is capable to adjust the pH value minutely is necessary. This is another reason why the conventional method is uneconomical.

(d) To avoid time delay in the operation of a pH regulator, an agitating device of large capacity which can reduce the time necessary for pH adjustment has to be used. The conventional method proves uneconomical in this respect, too.

(e) Excessive use of treating chemicals may lead to generation of toxic gas. In addition, there is a good possibility of trivalent chromium ion being re-oxidzed to hexavalent chromium ion by excessively added chlorine.

According to this invention, these defects of the conventional method can be completely eliminated by a treating method wherein the amount of treating chemicals is controlled by using a ORP-meter with a pH correction circuit which can generate output voltage indicating the ORP corresponding to a pre-set pH value through correction of ORP change occurring with change in pH value of waste solution.

The ORP meter with a pH correction circuit used in the method of this invention has a construction which comprises a ORP detecting part having a redox electrode and a reference electrode and a pH detecting part having a pH measurement electrode and a reference electrode, and which is capable to derive from output terminal of said correction circuit an output voltage indicating the ORP corresponding to a pre-set pH value of a solution tested through correction of ORP change caused by the pH change of the solution, by superimposing in said correction circuit the output voltage from the pH detecting part to that from the ORP detecting part. The output voltage derived from the correction circuit may be applied to a measuring instrument or a controlling circuit to attain the control operation of, for instance, feeding the treating chemical.

Figure 6:
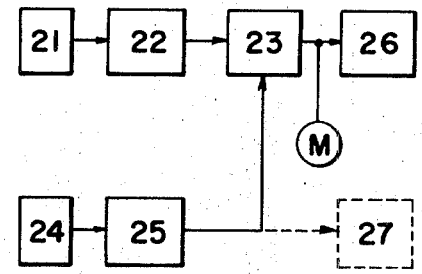
FIG. 6 is a block connection diagram showing a basic construction of a ROP meter with a pH correction circuit used in the method of this invention.

FIG. 6 is a block diagram illustrating the basic construction of a ORP meter with a pH-correction circuit. The ORP electromotive force detected by the ORP detecting part 21 depending upon the degree of reduction or oxidation of the solution tested, or the output voltage induced between the redox electrode and the reference electrode of said ORP detecting part 21 is amplified by an ORP amplifier 22, then is applied to a correction circuit 23. On the other hand, the pH electromotive force detected by the pH detecting part 24 depending upon the pH value of the solution tested, or the output voltage induced between the pH measurement electrode and the reference electrode is amplified by a pH amplifier 25, then is applied to said correction circuit 23. In the circuit 23 the applied two input voltages, that is the amplified ORP electromotive force and amplified pH electromotive force are so superposed that the resultant voltage which is equal to the ORP electromotive force indicating the redox degree of the solution tested when said solution is at a pre-set pH value is obtained as a corrected output voltage. Said output voltage is applied to a control circuit 26 to attain through said circuit 26 a desired control, for instance, control of amount of treating chemicals to be fed, and is also applied to an indicator M to obtain the indication of the ORP of the solution tested corresponding to said pre-set pH-value, or the redox degree of the solution presented by this ORP, regardless of pH change in the solution. In regard to the reference electrode provided at the ORP detecting part 21 and the reference electrode provided at the pH detecting part 24 of said ORP meter with a pH correction circuit, it is possible to use one common reference electrode for two purposes, if desired. Moreover, when it is desired to keep the pH value of the solution tested to the pre-set pH value as possible in order to minimize the error contained in the output voltage from said correction circuit, it is also possible to control the quantity of pH-adjusting solution fed, by applying the output voltage from pH amplifier 26 to another control circuit 27 as indicated by dotted lines in the drawing.

As the construction itself of the ORP meter with a pH correction circuit, doesn't constitute a matter involved in the gist of this invention, the description in detail of the construction of the meter in particular, the construction of the pH correction circuit, is omitted here. The construction of the ORP meter with a pH correction circuit and of the pH correction circuit is described in detail in the specification of the copending patent application (Title of Invention; "Red-ox Potentiometer with a pH Correction Circuit") filed by the same applicant on the same date with this application.

Figure 7:
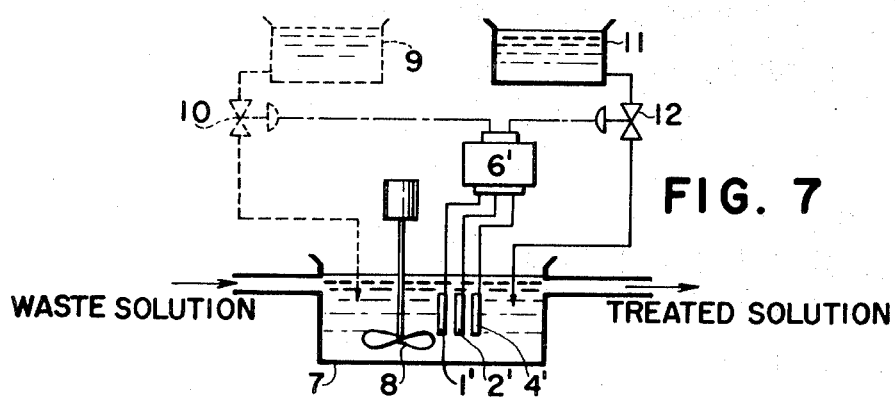
FIG. 7 is a schematic diagram of a system used for carrying out the treatment of waste solutions containing chromate ion or cyanide ion according to the method of this invention.

FIG. 7 shows an embodiment of the treatment system for treating chromate or cyanide waste solution by using an ORP meter with a pH correction circuit according to this invention. In FIG. 7, the same elements or parts as those of the treatment system shown in FIG. 1 are indicated by the same numerals, while the corresponding elements parts are shown by the same numerals with primes, respectively.

In the method according to this invention, a pH measuring glass electrode 1' a reference electrode such as a calomel electrode in the pH detecting part of the ORP meter 6' with a pH correction circuit, and a reference electrode 2' such as calomel electrode, and a precious metal redox electrode 4' in the ORP detecting part thereof (The reference electrode of the pH detecting part is also used as that of the ORP detecting part.) are arranged within the treatment tank 7, then, chromate or cyanide waste solution is flown into treatment tank 7 continuously. The ORP and pH electromotive force of the waste solution are detected by redox electrode 4' and reference electrode 2', and glass electrode 1' and reference electrode 2', respectively, while the solution is agitated continuously by an agitator 8. These two voltages detected are applied to the correction circuit, where the two voltages are superimposed to generate a corrected output voltage indicating the ORP of a waste solution having a pre-set pH value (3 for chromate waste solution, and 10 for cyanide waste solution), at the output terminal of said correction circuit. The corrected output voltage thus obtained is used for controlling, through the operation of a suitable controller (not illustrated), the flow regulator 12 associated with the chemical treatment tank 11 automatically, thereby regulating flow rate of treating chemicals (reducing agent for chromate waste solution: oxidizing agent for cyanide waste solution) to keep the quantity of treating chemicals fed to the treatment tank 7 to such a value which permits that the chemical reaction of waste solution treatment is always carried out at the equivalence point.

If the feed of treating chemicals is controlled by the ORP meter with a pH correction circuit, in accordance with this invention, the treating chemicals of the quantity which cause the chemical reaction at the equivalence point will be fed to the treatment tank, in response to the corrected output voltage always indicating the ORP corresponding to a pre-set pH value, regardless of ORP change occurring with pH change in the waste solution. For the purpose of minimizing the error included in the corrected output voltage obtained from the ORP meter, it is desirable to keep pH value of the waste solution to the pre-set pH value as possible. So if desired, it is possible to provide, as dotted lines in FIG. 7 show, a pH adjusting solution storage tank 9 similar to that in FIG. 1, and automatically control the flow regulator 10 attached to said tank 9 through the operation of a suitable controller (not shown) in response to the output voltage (see FIG. 6) from the pH detecting part 24 of the ORP meter 6 with a pH correction circuit, so that an acid solution (for chromate waste solution) or an alkali solution for cyanide waste solution) is fed to the treatment tank 7 in such a quantity that the pH value of the waste solution is always kept to the pre-set value.

The treatment according to this invention carried out by the treatment system shown in FIG. 7 wherein the ORP meter 6 with a pH correction circuit is used will be explained for the case of treating chromate waste solution, with reference to FIG. 2 and FIG. 3. At time $t_2$ in FIG. 3, the pH value of waste solution is at point "b" (pH=2) on the curve of the same figure as mentioned hereinabove, and 100% amount of the reducing agent needed is fed to the treatment tank 7. Therefore, if the treatment is carried out in the treatment system of FIG. 1 the ORP meter 6 indicates the ORP (410 mv.) at point "P" on the curve-A of FIG. 2. This potential is the same as that at point "R" on the curve-B for "pH=3," or the point indicating 72% amount of the reducing agent needed. Thus the flow regulator 12 is operated in the direction to increase the feed of reducing agent, which results in the excessive treatment.

In the ORP meter 6' with a pH correction circuit in the treatment system shown by FIG. 7, the ORP at point "P" on the curve-A detected by the ORP detecting part and the pH electromotive force detected by the pH detecting part are superimposed in the correction circuit, then a corrected voltage corresponds to the ORP at point "O" on the curve-B, or a voltage of 340 mv., 70 mv. lower than the voltage 410 mv. of the ORP at point "P" is generated across the output terminals of said correction circuit. Therefore, the flow regulator 12 is continuously kept in such a position that 100% of the amount of the reducing agent required is fed. In this way, the wasting of reducing agent due to the treatment in greater amount than necessary can be avoided.

At time $t_4$ in FIG. 3, the pH of said waste solution is at point "D" (pH=4) on the curve of the same figure as mentioned above, and 100% amount of the reducing agent required is fed to said treatment tank.

If an ordinary ORP meter 6 is used as in the case of the treatment system shown by FIG. 1, the meter 6 indicates the ORP (270 mv.) at point "Q" on the curve-C of FIG. 2, and the flow regulator 12 is controlled in response to the potential at point "U" on the curve-B indicating the same ORP corresponding to the pH value of pH=4, or the potential indicating 112% amount of reducing agent required, to decrease the amount of reducing agent to 75%. Then the regulator 12 is maintained to keep 75% feed, which leads to incomplete treatment. In the treatment system of FIG. 7 using the ORP meter 6' with a pH correction circuit, however, corrected output voltage corresponding to the ORP at point "O" on the curve-B, or a voltage of 340 mv., 70 mv. higher than the voltage 270 mv. of the ORP at point Q is generated, so that the flow regulator 12 continues to feed 100% the amount of reducing agent required. Thus, the occurrence of such an undesirable condition as the untreated waste solution is flown out from the treatment tank 7 because the incomplete treatment can be avoided.

The treatment carried out by the treatment system shown in FIG. 7 is explained for the case of treating cyanide waste solution with reference to FIG. 4 and FIG. 5.

At time $t_2$ in FIG. 5, the flow regulator 12 is kept in such a position as mentioned above, to feed 100% the amount of oxidizing agent required to treatment tank 7. At the time the pH value of the waste solution has changed to the value at point "b" (pH=11) on the curve The ORP meter 6 with a pH correction circuit doesn't indicate the ORP at point "P" on the curve-A of FIG. 4 as the ordinary ORP meter 6 used in the treatment system shown by FIG. 1, but indicates corrected voltage corresponding to the ORP at point "O" on the curve-B. So, the flow regulator 12 is not operated in the direction to decrease the quantity of oxidizing agent, but is kept continuously in such a position as to feed 100% of the amount of oxidizing agent. As a result, the occurrence of undesirable condition which would result if the untreated toxic cyanide waste solution were flown out from the treatment tank 7 owing to incomplete treatment resulting from a shortage of oxidizing agents, is avoided.

Data obtained by the experiments of the treatment of waste solutions containing cyanide ion and waste solutions containing chromate ion according to the method of this invention and the conventional method are shown respectively in the following Tables 1 and 2.

TABLE 1

Results of cyanide ion containing waste solution treatment

| Experiment No. | Flow rate (m.³/h.) | pH (in tank) | CN-conc. before treatment, p.p.m. (in tank) | CN-con. after treatment, p.p.m. (at a mouth of discharge) | Conc. of excessive chlorine, p.p.m. (at an outlet of ripening tank) | Quantity of chemicals used, kg. (NaClO) |
|---|---|---|---|---|---|---|
| Conventional method: | | | | | | |
| 1 | 3.0 | 11.7 | 29.0 | 0.8 | 154 | 180 |
| 2 | 2.8 | 12.5 | 41.2 | 0.6 | 430 | |
| 3 | 2.5 | 12.0 | 30.5 | 0.4 | 220 | 175 |
| 4 | 2.6 | 11.5 | 25.0 | 1.0 | 160 | |
| 5 | 3.1 | 12.5 | 34.4 | Trace | 450 | 165 |
| 6 | 2.5 | 12.2 | 27.9 | 0.8 | 80 | |
| Method of this invention: | | | | | | |
| 7 | 2.6 | 11.9 | 32.8 | Trace | 15 | 60 |
| 8 | 2.8 | 12.3 | 30.4 | Trace | 10 | |
| 9 | 3.0 | 12.5 | 41.2 | 0.1 | 20 | 80 |
| 10 | 3.0 | 11.7 | 45.1 | Trace | 8 | |
| 11 | 3.1 | 12.0 | 28.0 | Trace | 5 | 75 |
| 12 | 2.5 | 11.9 | 31.3 | Trace | 10 | |

NOTE:
1. Average working hours of each experiment—approx. 9 hours.
2. Sodium hypochlorite (NaClO)—containing 12% of available chlorine on sale.
3. Sodium bisulfite (NaHSO₃)—35% solution on sale.

TABLE 2

Results of chromate ion containing waste solution treatment

| Experiment No. | Flow rate (m.³/h.) | pH (in tank) | $Cr^{6+}$ conc. before treatment, p.p.m. (in tank) | $Cr^{6+}$ conc. in reducing tank, p.p.m. | $Cr^{6+}$ conc. in pH adjustment tank | Quantity of chemicals used, kg. (NaHSO₃) |
|---|---|---|---|---|---|---|
| Conventional method: | | | | | | |
| 1 | 1.5 | 4.5 | 27.3 | Trace | 1.2 | 7.3 |
| 2 | 2.0 | 6.0 | 13.0 | 1.1 | 5.8 | |
| 3 | 1.8 | 5.5 | 23.1 | Trace | 0.65 | 7.8 |
| 4 | 2.2 | 5.3 | 18.6 | 0.6 | 3.3 | |
| 5 | 1.8 | 4.8 | 20.3 | 0.2 | 7.5 | 7.0 |
| 6 | 1.8 | 5.3 | 22.8 | 0.8 | 0.9 | |
| Method of this invention: | | | | | | |
| 7 | 2.0 | 5.2 | 25.0 | Trace | Trace | 5.0 |
| 8 | 2.0 | 5.5 | 26.3 | Trace | Trace | |
| 9 | 1.6 | 5.0 | 24.6 | Trace | Trace | 5.5 |
| 10 | 1.8 | 4.4 | 31.4 | Trace | Trace | |
| 11 | 1.8 | 5.2 | 17.1 | Trace | 0.1 | 5.0 |
| 12 | 2.0 | 5.5 | 21.9 | Trace | Trace | |

NOTE:
1. Average working hours of each experiment—approx. 9 hours.
2. Sodium hypochlorite (NaClO)—containing 12% of available chlorine on sale.
3. Sodium bisulfite (NaHSO₃)—35% solution on sale.

of the same figure. The ORP meter 6' with a pH correction circuit doesn't indicate the ORP at point "Q" on the curve-C of FIG. 4 as an ordinary ORP meter 6 used in the treatment system in FIG. 1, but indicates a corrected voltage corresponding to the ORP at point "O" on the curve-B for the pre-set pH value, pH=10, the flow regulator 12 continuously feeds 100% amount of oxidizing agent required, thus the wasteful use of oxidizing agent through the excessive treatment can be avoided.

At time $t_4$ in FIG. 5, the flow regulator 12 is in the state, as previously mentioned, to feed 100% amount of said oxidizing agent required, and the pH value of the waste solution has changed to the value at point "d" (pH=9) on the same curve.

As is apparent from the explanation described above, the treatment method according to this invention brings the following great advantages.

(a) Occurrence of an undesirable condition as the discharge of toxic, untreated waste solution due to the shortage of treating chemicals fed, can be prevented.

(b) Waste of the treating chemicals and generation of poisonous gases, due to the excessive use of treating chemicals, can be prevented.

(c) Necessity of setting the feeding quantity of treating chemicals to an uneconomically larger amount than needed, in order to ensure safety, is eliminated.

(d) As it is unnecessary to keep the pH of the waste solution exactly to a given value, the use of a pH controller can be omitted when there is only a small change in pH value of the waste solution, and the pH controller can be much simplified, even when there is a great change in pH value.

(e) The necessity of using an agitating device of large capacity to shorten the time needed for pH adjustment is eliminated, and a device of small capacity can be used.

The above-mentioned merits will completely overcome various defects found in the conventional treatment methods.

Although this invention is described by referring to specific examples embodied in this invention, this invention is not limited to the examples mentioned above.

What I claim is:

1. A method of treating a waste solution containing chromate ion or cyanide ion, characterized by using a redox potentiometer having a redox potential detecting part and a pH detecting part and provided with a pH correction circuit, and the output voltages from said respective detecting parts are superimposed within said pH correction circuit so that the variations of redox potential caused by the variations of pH value of the waste solution treated are compensated and a corrected output voltage which indicates the redox potential corresponding to a pre-set pH value of the waste solution results; detecting the redox potential and the pH electromotive force of the waste solution in a waste solution treatment tank respectively by said respective detecting parts; and controlling the amount of treating chemicals fed to said waste solution treatment tank in response to said corrected output voltage from said pH correction circuit of the redox potentiometer.

References Cited

UNITED STATES PATENTS

| 3,743,598 | 7/1973 | Field | 210—96 |

FOREIGN PATENTS

| 895,740 | 5/1962 | England | 210—59 |
| 895,740 | 5/1962 | Great Britain | 210—59 |

OTHER REFERENCES

Chem. Abstr.; *Automatic Regulation of pH;* Vol. 69: 28812g.

CHARLES N. HART, Primary Examiner

B. CASTEL, Assistant Examiner

U.S. Cl. X.R.

210—59, 96, 62